C. F. FISK.
VEHICLE TIRE.
APPLICATION FILED SEPT. 26, 1908.
938,999.
Patented Nov. 2, 1909.
2 SHEETS—SHEET 1.
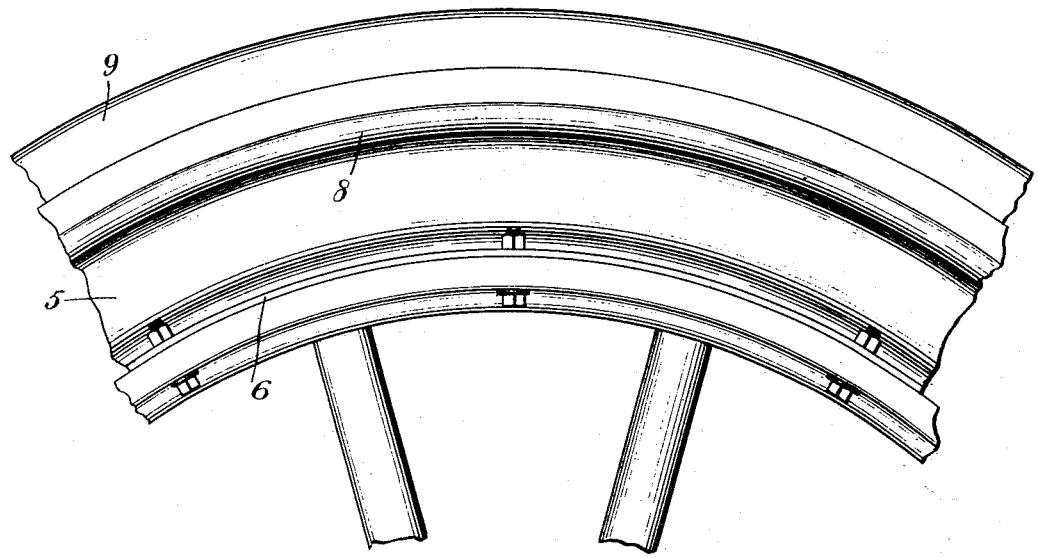
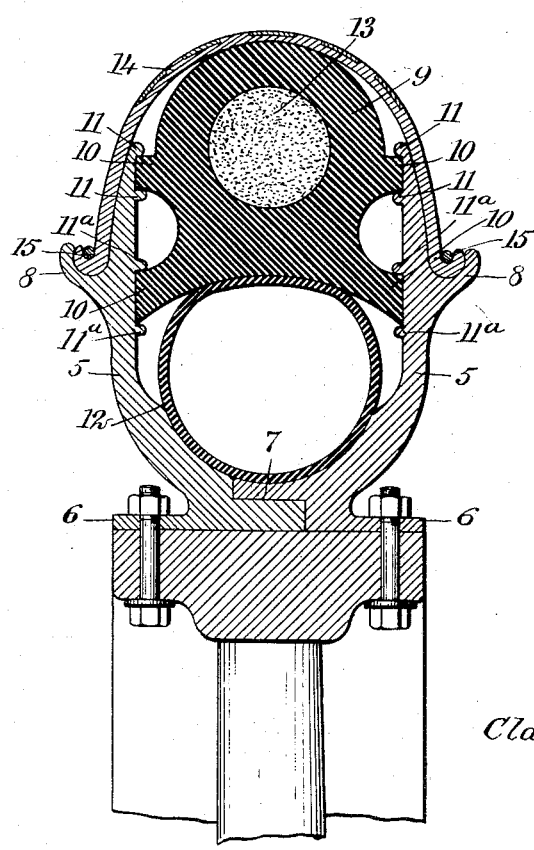
WITNESSES
INVENTOR
Clark Francis Fisk
BY
ATTORNEYS C. F. FISK.
VEHICLE TIRE.
APPLICATION FILED SEPT. 26, 1908.
938,999.
Patented Nov. 2, 1909.
2 SHEETS—SHEET 2.
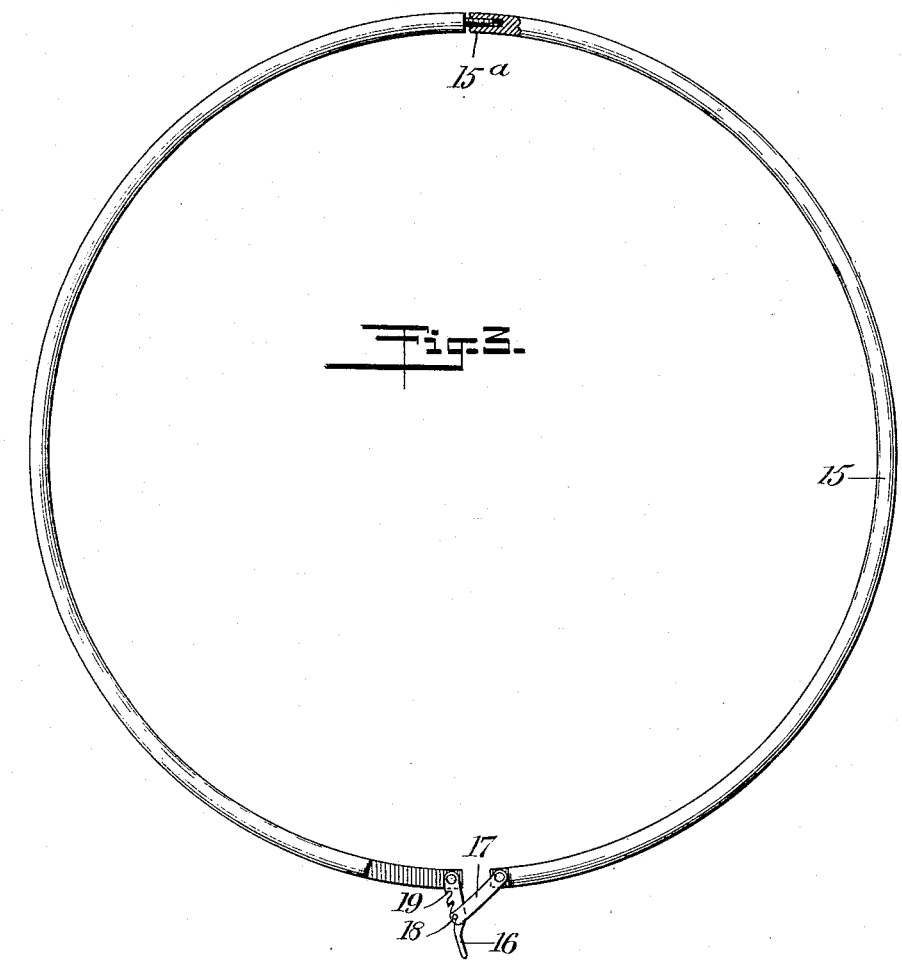
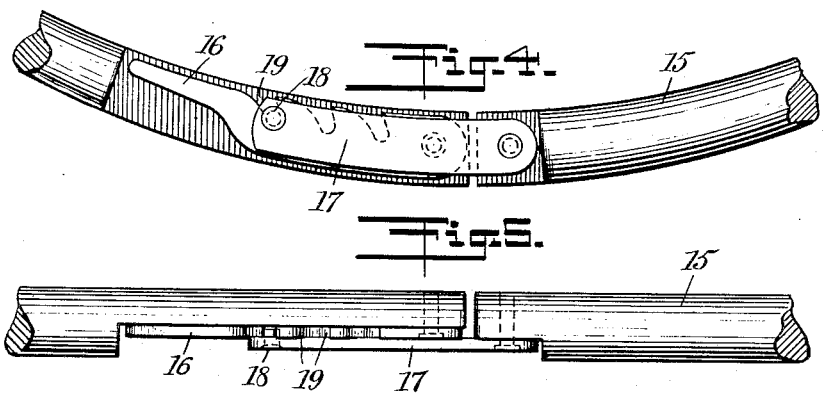
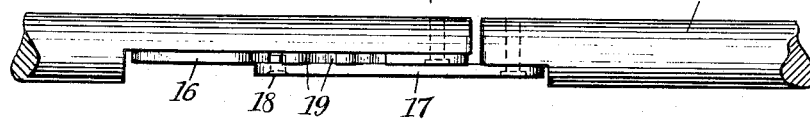
WITNESSES
INVENTOR
Clark Francis Fisk
BY
ATTORNEYS

UNITED STATES PATENT OFFICE.

CLARK FRANCIS FISK, OF ALLENTOWN, NEW JERSEY.

VEHICLE-TIRE.

938,999.  Specification of Letters Patent.  Patented Nov. 2, 1909.

Application filed September 26, 1908. Serial No. 454,844.

*To all whom it may concern:*

Be it known that I, CLARK FRANCIS FISK, a citizen of the United States, and a resident of Allentown, in the county of Monmouth and State of New Jersey, have invented a new and Improved Vehicle-Tire, of which the following is a full, clear, and exact description.

The invention has in view a puncture-proof tire which will have approximately the same resiliency as the conventional pneumatic construction, while possessing advantages thereover in strength and durability.

To this end the invention in a general way consists of a rim composed of two sections bolted or otherwise detachably secured to the felly of the wheel and having relatively deep outwardly-extending flanges, with a shoe rim at the outside of each flange, a tire proper having resilient ribs in engagement at their extremities only with the inner faces of the flanges and with the tire and ribs otherwise disengaged from the rim, a shoe extending around the tread of the tire having its edges located in the shoe rims, and clamping rings securing the shoe to the shoe rims.

Reference is to be had to the accompanying drawings forming a part of this specification, in which similar characters of reference indicate corresponding parts in all the views.

Figure 1 is a fragmentary view of a vehicle wheel having my improved tire applied thereto, with the shoe of the tire removed; Fig. 2 is a cross-section through the same, the shoe being in position; Fig. 3 is a face view of one of the clamping rings for detachably securing the shoe; Fig. 4 is a fragmentary view of the ring on an enlarged scale, showing the clamping lever in a closed position; and Fig. 5 is an inside edge view of the construction shown in Fig. 4.

The construction of my improved puncture-proof tire, more specifically set forth, embodies a rim composed of two half sections 5, 5, each section having a base flange 6 which is bolted or otherwise detachably secured to the felly of the vehicle wheel. At the center of the rim the sections overlap each other as indicated at 7, for which purpose each is constructed with a rabbeted edge to insure a neat fit. From the center of the rim the sections curve toward the sides and then extend outwardly from the wheel, forming relatively deep flanges, with each flange provided with a shoe rim 8 arranged at the outside a substantial distance from the outer edge. The tire proper 9 has laterally-extending ribs 10 in engagement with the inner faces of the flanges of the rim, the outer rib 10 being located adjacent to the outer edge of the rim and retained between beads 11, shown to be formed integrally with the flanges. Similar beads $11^a$, also in connection with the flanges, serve to engage the bottom ribs 10 a substantial distance from the groove in the bottom of the rim, leaving sufficient space therebetween for a pneumatic tube 12, which is inflated in the usual manner. The pneumatic tube presses against the under or inner side of the tire 9, which is shown to be of arched construction, and its expansion takes place when flattened or compressed within these spaces at opposite sides, as clearly shown in Fig. 2.

The tire 9 is ordinarily constructed of rubber or rubber and canvas or other resilient material and has a central rope core or filler 13 serving to augment its strength. Over the tread of the tire extends a shoe 14, with its edges lying in the shoe rims 8, in which they are secured by means of suitable clamping rings 15 of the construction illustrated in Figs. 3, 4 and 5, wherein it will be observed each ring is made up of two half sections, the opposed ends at one side being threaded together as indicated at $15^a$, and the opposed ends at the opposite side being secured by a locking mechanism consisting of a locking lever 16 fulcrumed on one of the ring sections, and a link 17 fulcrumed on the other ring section, having a pin or projection 18 adapted to engage within one of the notches 19 in the edge of the lever. In this manner of connecting the sections of the ring, an adjustable connection is afforded at each side, enabling the adjustment of the ring to approximately any size within certain limits. In order that the locking lever and link of the ring may be entirely out of the way when in a locked position, the ends of the ring sections where they are attached are flattened at one side, as clearly shown in Figs. 4 and 5.

In the working of the tire, a resiliency is not only afforded by the pneumatic tube, but also by the ribs 10, which yield under compression and return the tire to normal position when the load is removed. In some cases it may be found that the resiliency of the ribs of the tire proper is sufficient for all purposes, more especially when these ribs form a sealed air chamber with the inner portion of the rim flanges, in which case the pneumatic tube or other like located elastic means may be dispensed with. In removing or applying the tire it is only necessary after the shoe is unclamped at one side that the bolts through one of the rim sections be removed, when the said section can be readily slipped from the side of the wheel. This leaves the tire exposed and it can be withdrawn with the hands, the entire operation requiring no other tools than a wrench for removing the rim bolts.

Having thus described my invention, I claim as new and desire to secure by Letters Patent:

1. The combination of a rim composed of two half sections detachably connected together, each having a shoe rim at the outside thereof, a tire carried by the rim, a shoe having its edges located in the shoe rims and extending over the tread of the tire, and clamping rings to secure the shoe to the rims, applicable to and removable from the rims while the shoe is in place.

2. The combination of a vehicle wheel, a rim composed of sections detachably secured to the felly of the wheel, each section having a shoe rim and a relatively deep flange, a relatively thick tire of elastic material having ribs at opposite sides, each flange having beads on its inner face in engagement with the extremities of the ribs at both the inner and outer sides thereof, the tire and ribs being otherwise separated from the rim, and a shoe extending over the tire, with the edges thereof detachably secured within the shoe rim.

3. The combination of a rim having relatively deep outwardly-extending flanges, and a tire having resilient ribs at each side spaced apart, with the extremities of the ribs supported at both sides from the inner faces of the flanges, and with the tire and ribs otherwise spaced from and out of contact with the flanges.

In testimony whereof I have signed my name to this specification in the presence of two subscribing witnesses.

CLARK FRANCIS FISK.

Witnesses:
CHAS. A. SPAULDING,
WM. C. SMITH.